(12) United States Patent
Miller

(10) Patent No.: US 9,321,596 B2
(45) Date of Patent: Apr. 26, 2016

(54) CLAMP MOUNTED VIBRATOR AND METHOD RELATED TO THE SAME

(71) Applicant: Martin Engineering Company, Neponset, IL (US)

(72) Inventor: Travis J. Miller, Annawan, IL (US)

(73) Assignee: Martin Engineering Company, Neponset, IL (US)

( * ) Notice: Subject to any disclaimer, the term of this patent is extended or adjusted under 35 U.S.C. 154(b) by 524 days.

(21) Appl. No.: 13/840,695

(22) Filed: Mar. 15, 2013

(65) Prior Publication Data

US 2014/0269150 A1    Sep. 18, 2014

(51) Int. Cl.
| | | |
|---|---|---|
| *B01F 11/00* | (2006.01) | |
| *B65G 27/08* | (2006.01) | |
| *B06B 1/16* | (2006.01) | |
| *B07B 1/42* | (2006.01) | |
| *B07B 1/46* | (2006.01) | |
| *B07B 13/16* | (2006.01) | |

(52) U.S. Cl.
CPC . *B65G 27/08* (2013.01); *B06B 1/16* (2013.01); *B07B 1/42* (2013.01); *B07B 1/46* (2013.01); *B07B 13/16* (2013.01)

(58) Field of Classification Search
CPC .................................................. B01F 11/0062
USPC ................................................ 366/114, 128
See application file for complete search history.

(56) References Cited

U.S. PATENT DOCUMENTS

| | | | | |
|---|---|---|---|---|
| 1,901,122 | A | * | 3/1933 | Robins ..................... F16H 33/08 366/128 |
| 2,236,378 | A | | 3/1941 | Overstrom et al. |
| 3,134,564 | A | | 5/1964 | Peterson |
| 3,167,669 | A | * | 1/1965 | Bodine .................. H02K 33/12 310/10 |
| 3,633,905 | A | | 1/1972 | Etchelecou |
| 3,839,918 | A | | 10/1974 | Fischer |
| 3,929,642 | A | | 12/1975 | Ennis et al. |

* cited by examiner

*Primary Examiner* — David Sorkin
(74) *Attorney, Agent, or Firm* — Thompson Coburn LLP; Clyde L. Smith

(57) ABSTRACT

A bulk material handling assembly comprises a pair of spaced-apart walls, an elongate vibrator, a pair of saddle clamps, and a pair of locking members. The saddle clamps encircle and releasably secure the axial end portions of the vibrator to the spaced-apart walls of the bulk material handling assembly. The locking members are secured to the saddle clamps and to the end portions of the vibrator.

6 Claims, 5 Drawing Sheets

CLAMP MOUNTED VIBRATOR AND METHOD RELATED TO THE SAME

CROSS-REFERENCE TO RELATED APPLICATIONS

Not Applicable.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention pertains generally to bulk material handling assemblies including, but not limited to, bulk material feeders, screen separators, and chutes. More specifically, the present invention pertains to such assemblies that include vibrators used to shake the assemblies so as to prevent bulk material stagnation or to promote bulk material separation. In particular, the present invention pertains to a saddle clamp mounting system for attaching a vibrator to a bulk material handling assembly.

2. General Background

The use of vibrators on bulk material handling systems is well known. Vibrators are often used on assemblies such as bulk material feeders, screen separators, chutes, and hoppers. There are several common methods of attaching vibrators to such bulk material handling assemblies. One way of doing so is to configure the vibrator as an elongate tube that spans the distance between two spaced-apart walls of the assembly. An example of this type of mounting system is provided in U.S. Pat. No. 3,929,642, which is hereby incorporated by reference in its entirety. Another way of attaching vibrators to such bulk material handling assemblies is to provide the vibrators with a foot mounting system that is configured to mount the vibrator against a single flat surface. Such a vibrator is disclosed in U.S. patent application Ser. No. 13/458,582, filed on Apr. 27, 2012, which also is hereby incorporated by reference in its entirety. In either case, the weight of the vibrators makes it difficult for service personnel to align the vibrators properly during installation or replacement of such vibrators. Thus, there remains a need for a mounting system that facilitates the installation of vibrators and that is still robust.

SUMMARY OF THE INVENTION

In one aspect of the invention, a bulk material handling assembly comprises a pair of spaced-apart walls, an elongate vibrator, a pair of saddle clamps, and a pair of locking members. The elongate vibrator has a longitudinal axis and axially opposite end portions. The vibrator is configured to induce vibrations acting perpendicular to the longitudinal axis of the vibrator. Each of the saddle clamps comprises first and second clamp halves that are releasably secured to each other. One of the pair of saddle clamps encircles and releasably secures one of the axial end portions of the vibrator to one of the spaced-apart walls of the bulk material handling assembly. The other of the pair of saddle clamps encircles and releasably secures the other of the axial end portions of the vibrator to the other of the spaced-apart walls of the bulk material handling assembly. One of the locking members is secured to one of the saddle clamps and to said saddle clamp's respective end portion of the vibrator. The other of the locking members is secured to the other of the saddle clamps and to said saddle clamp's respective end portion of the vibrator.

Another aspect of the invention pertains to a method of securing an elongate vibrator to a bulk material handling assembly. The vibrator has a longitudinal axis and axially opposite first and second end portions. The vibrator is configured to induce vibrations acting perpendicular to the longitudinal axis of the vibrator. The method comprises accessing a bulk material handling assembly having first and second spaced-apart walls. The method also comprises releasably securing the first end portion of the vibrator to the first wall of the bulk material handling assembly via a first saddle clamp. The first saddle clamp comprises first and second halves. The securing step comprises releasably attaching the first and second halves of the first saddle clamp to each other in a manner such that they collectively encircle the first end portion of the vibrator. The method further comprises releasably securing the second end portion of the vibrator to the second wall of the bulk material handling assembly via a second saddle clamp. The second saddle clamp comprises first and second halves. The securing step comprises releasably attaching the first and second halves of the second saddle clamp to each other in a manner such that they collectively encircle the second end portion of the vibrator. The method still further comprises releasably securing a first locking member to the first saddle clamp and to the first end portion of the vibrator, and releasably securing a second locking member to the second saddle clamp and to the second end portion of the vibrator.

Yet another aspect of the invention pertains to a method of servicing a bulk material handling assembly. The bulk material handling assembly comprises a pair of spaced-apart walls, an elongate vibrator, a pair of saddle clamps, and a pair of locking members. The elongate vibrator has a longitudinal axis and axially opposite end portions. The vibrator is configured to induce vibrations acting perpendicular to the longitudinal axis of the vibrator. Each of the saddle clamps comprises first and second clamp halves that are releasably secured to each other. One of the pair of saddle clamps encircles and releasably secures one of the axial end portions of the vibrator to one of the spaced-apart walls of the bulk material handling assembly. The other of the pair of saddle clamps encircles and releasably secures the other of the axial end portions of the vibrator to the other of the spaced-apart walls of the bulk material handling assembly. One of the locking members is secured to one of the saddle clamps and said saddle clamp's respective end portion of the vibrator. The other of the locking members is secured to the other of the saddle clamps and said saddle clamp's respective end portion of the vibrator. Each of the locking members is ring-shaped and has a central opening. Each of the end portions of the vibrator comprises an access cover. The access covers are removable through the central openings of the locking members. The method comprises removing at least one of the access covers from the vibrator by pulling the access cover through the central opening of one of the locking members.

Further features and advantages of the present invention, as well as the operation of the invention, are described in detail below with reference to the accompanying drawings.

Figure 1:
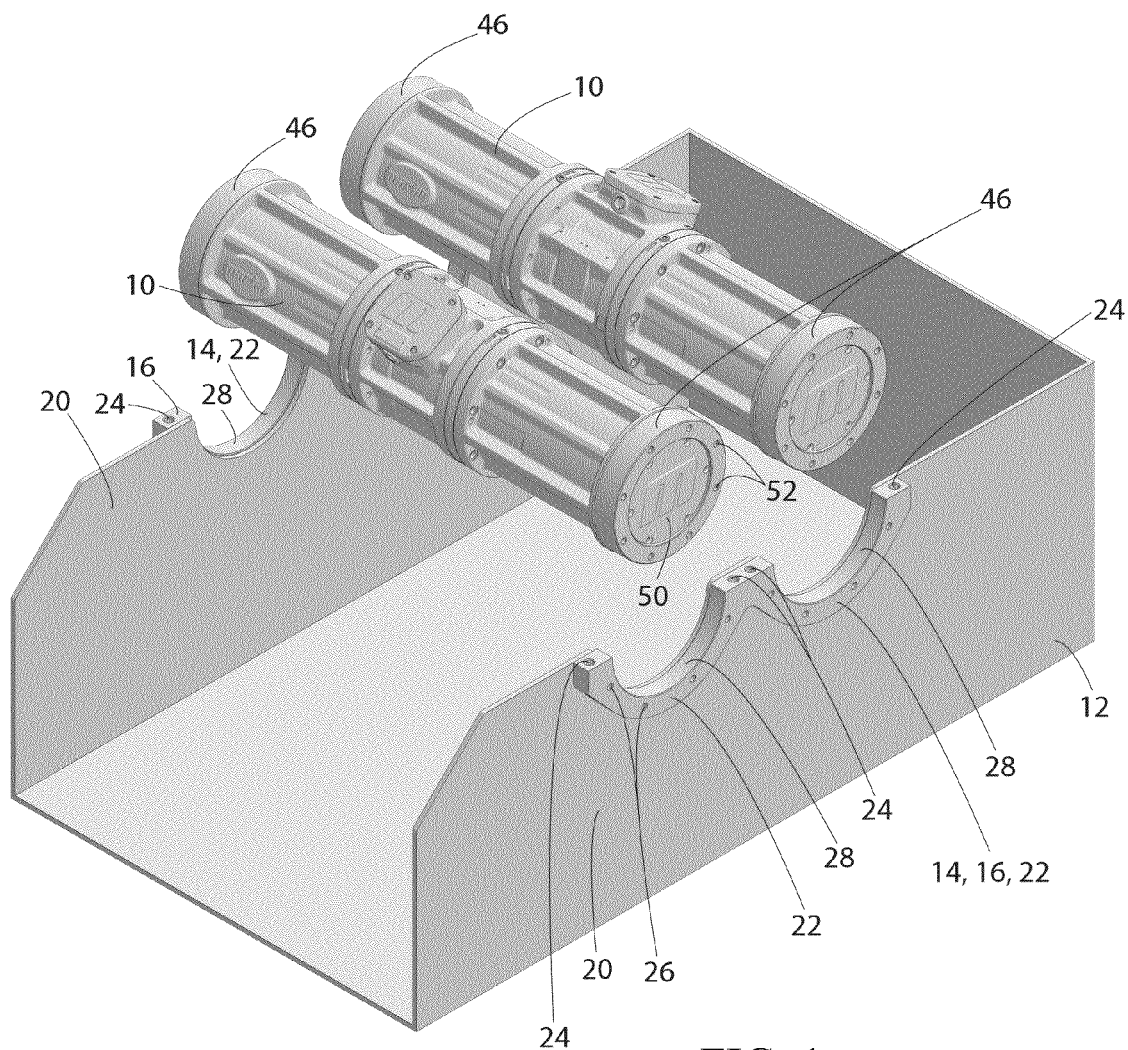
FIG. 1 is a perspective view showing the vibrators being lowered onto the fixed halves of the saddle clamps that are attached to the bulk material handling assembly.

Reference numerals in the written specification and in the drawing figures indicate corresponding items.

DESCRIPTION OF THE PREFERRED EMBODIMENT

Figure 2:
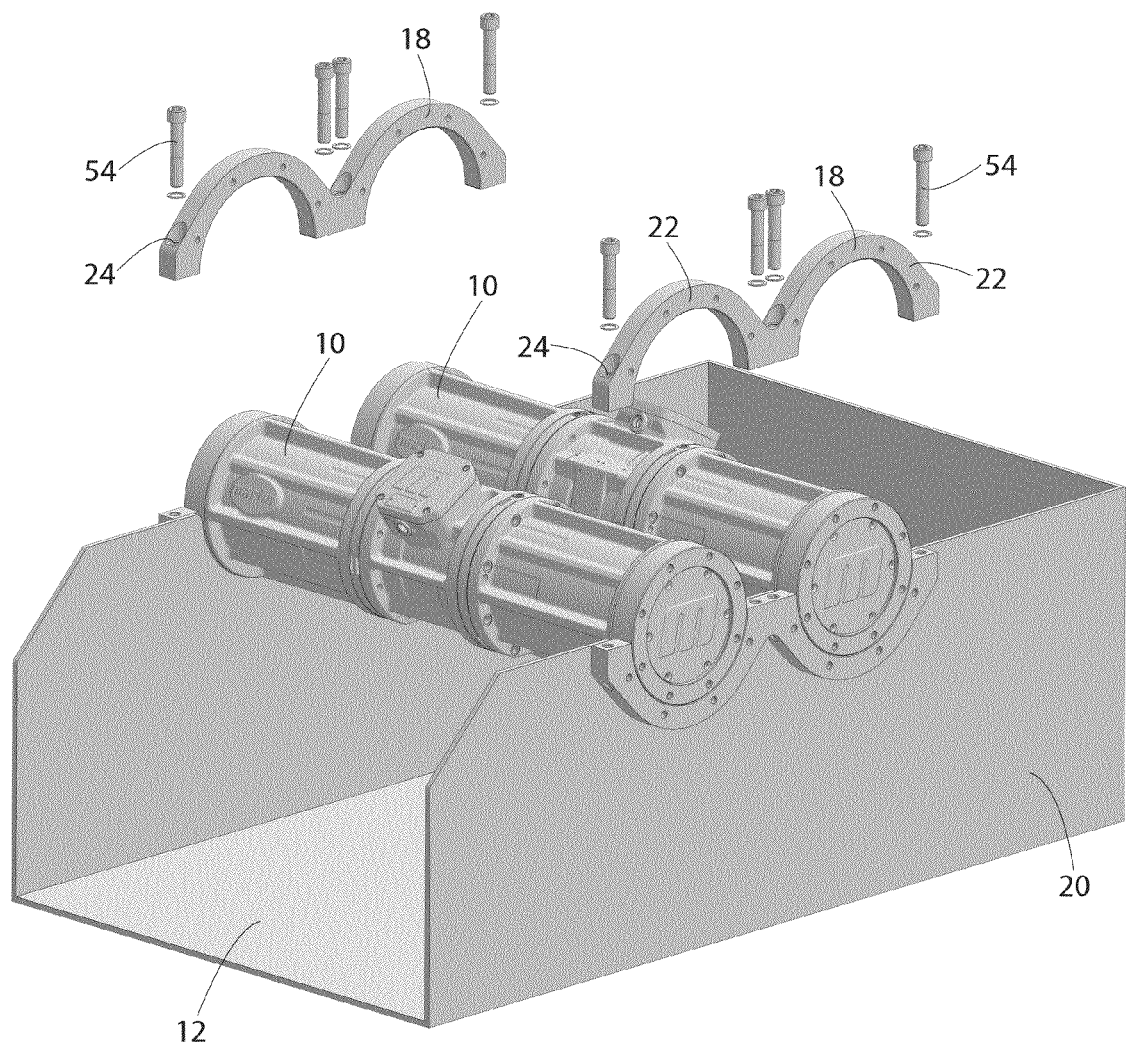
FIG. 2 is a perspective view showing the removable halves of the saddle clamps being attached to the fixed halves of the saddle clamps.
Figure 3:
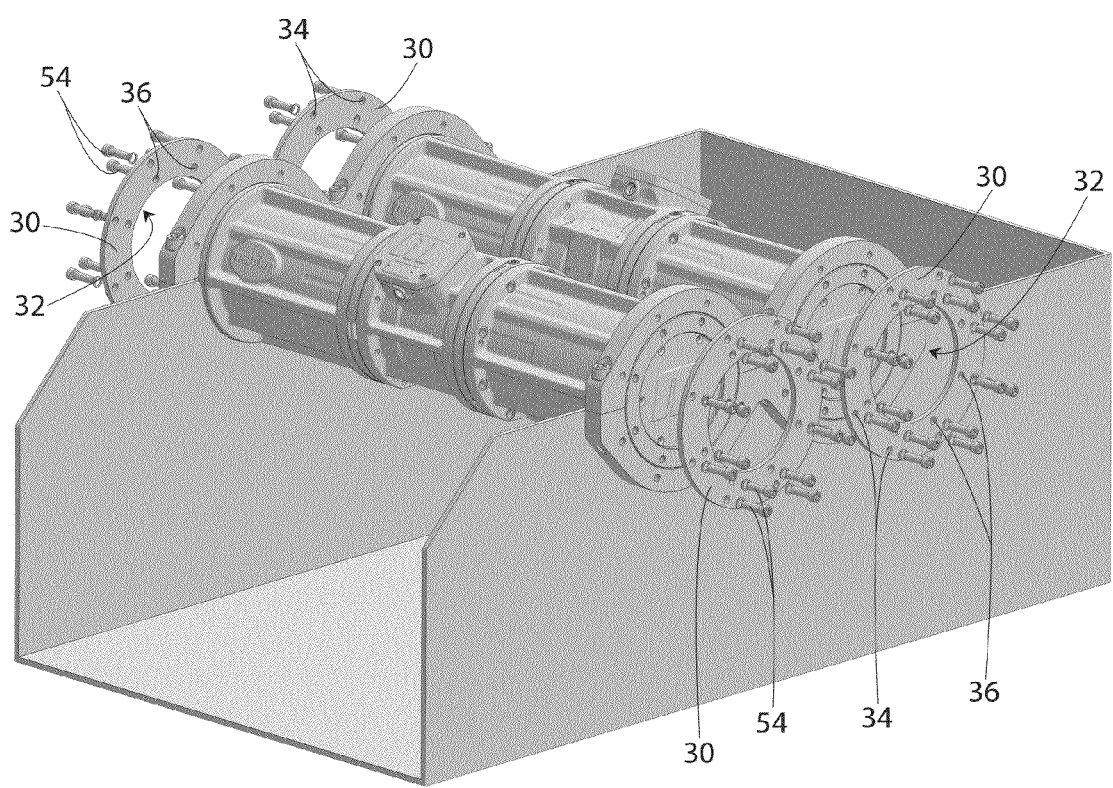
FIG. 3 is a perspective view showing the locking members being attached to the assembly.
Figure 4:
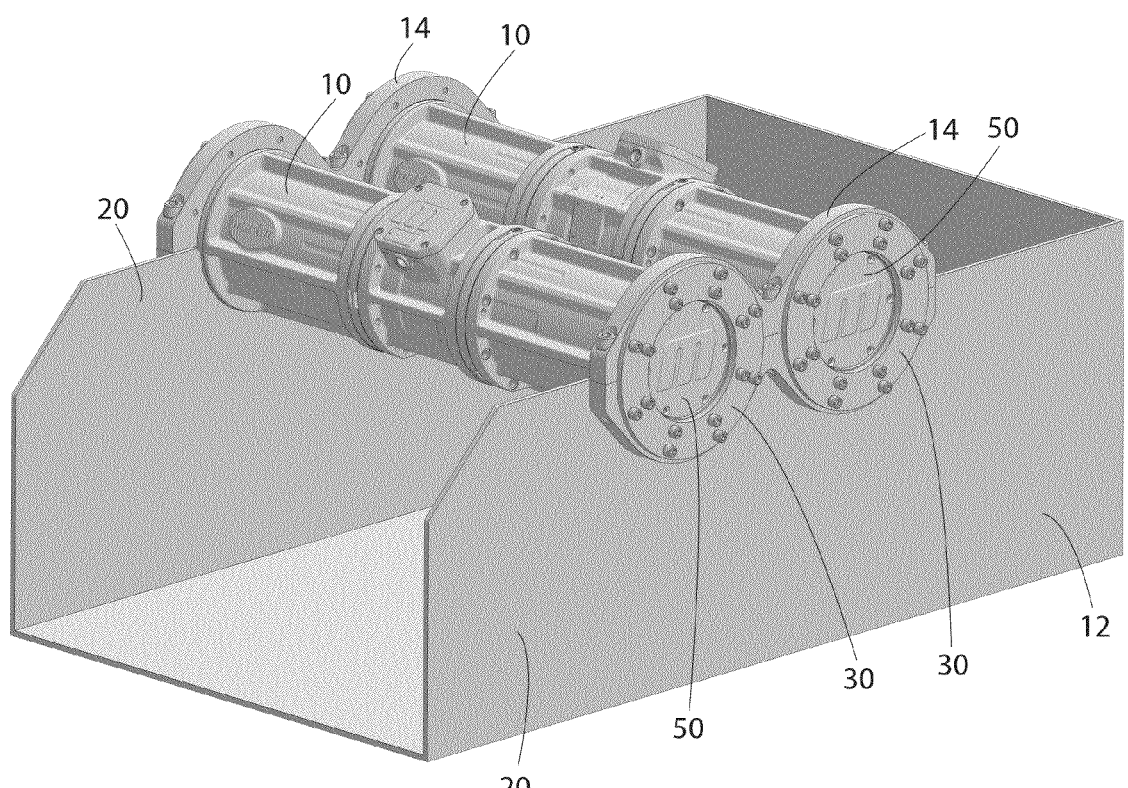
FIG. 4 is a perspective view of the bulk material handling assembly with the vibrators fully installed thereon.

FIGS. 1-3 depict a preferred method of attaching elongate vibrators 10 to a bulk material handling assembly 12 using a pair of saddle clamps 14. FIG. 4 depicts the vibrators 10 fully installed on the bulk material handling assembly 12.

Each saddle clamp 14 preferably comprises a fixed half 16 and a removable half 18. The fixed half 16 of one of the saddle clamps 14 is rigidly attached to a wall 20 of the bulk material handling assembly 12, preferably via welding. The fixed half 16 of the other saddle clamp 14 is rigidly attached to another wall 20 of the bulk material handling assembly 12. Each of the saddle clamp halves 16, 18 comprises one or more cradles 22. The number of cradles 22 per clamp half is preferably equal to the number of vibrators 10 being attached to the bulk material handling assembly 12 (as shown, two). Each half of each saddle clamp 14 also preferably comprises a plurality of primary bolt-holes 24. Preferably, each half comprises at least one or more primary bolt-holes 24 than it has cradles 22 such that a primary bolt-hole 24 is positioned on either side of each cradle 22. More preferably and as shown, each half comprises two primary bolt-holes 24 for every cradle 22 it has such that the bolts passing therethrough (discussed below) will be evenly loaded. The primary bolt-holes 24 of the fixed half 16 of each saddle clamp 14 are preferably threaded and are configured to align with and face the primary bolt-holes of the removable half 18 (which preferably are not threaded) of that saddle clamp. Each half of each saddle clamp 14 also preferably comprises a plurality of threaded secondary bolt-holes 26. Each cradle 22 preferably has a semi-cylindrical cradle surface 28 and the secondary bolt-holes 26 are preferably oriented parallel to and circumferentially about each semi-cylindrical cradle surface 28.

The attachment means also preferably comprises two locking members 30 per vibrator 10 being attached to the bulk material handling assembly 12. Each locking member 30 preferably is in the form of a ring-shaped plate having a central opening 32. Each locking member 30 preferably comprises a plurality of outermost bolt-holes 34 and a plurality of innermost bolt-holes 36, all of which are oriented circumferentially around the central opening 32 of the locking member.

Figure 5:
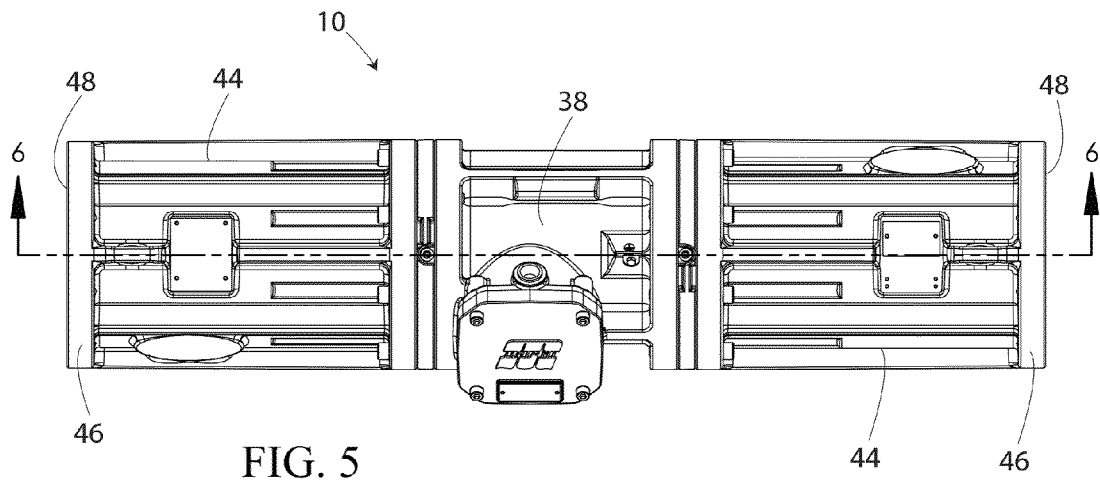
FIG. 5 is a top view of an elongate vibrator.
Figure 6:
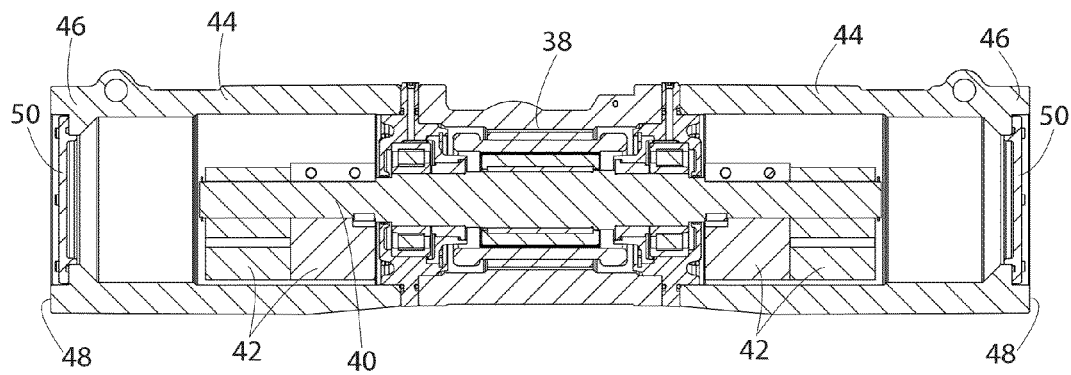
FIG. 6 is a cross-section of the elongate vibrator shown in FIG. 5, and is taken about the line 6-6 shown in FIG. 5.
Figure 7:
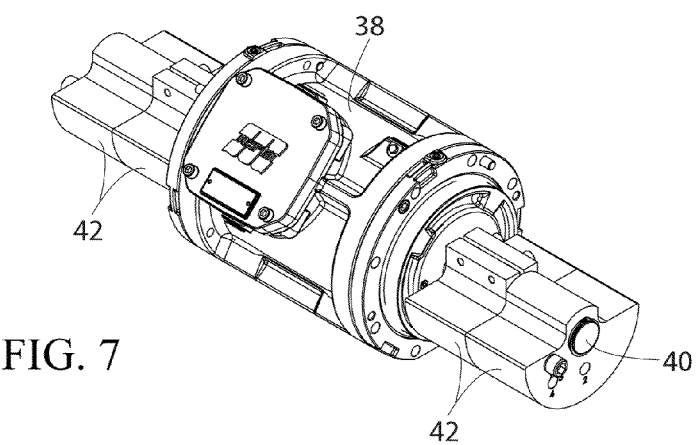
FIG. 7 is a perspective view of the vibrator shown in FIG. 5, and is shown with its end housings omitted.

FIGS. 5-7 depict an example of an elongate vibrator 10 in accordance with the invention. The vibrator 10 has a longitudinal axis and comprises a drive mechanism 38 that is configured to rotationally drive a driveshaft 40 about the longitudinal axis. A pair of eccentric weights 42 are attached to the driveshaft 40 outboard of the drive mechanism 38 and on each axial side of the drive mechanism. As such, the vibrator 10 is configured to induce vibrations in a plane normal to the longitudinal axis when the driveshaft revolves. Each axial end of the vibrator 10 also comprises an end housing 44 that is attached to the respective end of the drive mechanism and that houses the respective eccentric weights 42 and end of the driveshaft 40. Each end housing 44 also comprises an end portion 46 that is adjacent to an end face 48. Still further, each end housing 44 further comprises a removable access cover 50 which is encircled by the end face 48. The end portion 46 is preferably cylindrical or is at least configured to mate with the shape of the cradle surfaces 28 of the saddle clamps 14. The access cover 50 is configured to provide service personnel access to the eccentric weights 42. The end face preferably comprises a plurality of circumferentially arranged bolt-holes 52.

The assembly of the vibrators 10 to the bulk material handling assembly 12 begins by simply lowering each vibrator onto the fixed halves 16 of the saddle clamps 14 in a manner such that the vibrator spans the distance between the walls 20 of the bulk material handling assembly. During this process, one of the end portions 46 of either vibrator 10 engages a cradle surface 28 on the fixed half 16 of one of the saddle clamps 14 and the other end portion of said vibrator engages a cradle surface 28 on the fixed half 16 of the other saddle clamp 14. Since the cradle surfaces 28 and the end portions 46 of the vibrators 10 are preferably cylindrical, the rotational orientation of the vibrators about their longitudinal axes is not critical at this stage. With the vibrators 10 in position on the fixed halves 16 of the saddle clamps 14, the removable halves 18 of the saddle clamps 14 are lowered onto the fixed halves of the saddle clamps in a manner such that each end portion 46 of each vibrator 10 is loosely sandwiched by a cradle 22 of the removable half of a saddle clamp 14 and a cradle of the fixed half 16 of said saddle clamp. Bolts 54 are then passed through the primary bolt-holes 24 of the removable halves 18 of the saddle clamps 14 and are loosely threaded into the primary bolt-holes of the fixed halves 16 of the saddle clamps.

Following the foregoing steps, the locking members 30 are then positioned adjacent the end faces 48 of the vibrators 10 and are rotated until the outermost bolt-holes 34 of each locking member aligns with the corresponding secondary bolt-holes 26 of the saddle clamps 14. At this point, a few bolts 54 can be passed through the outermost bolt-holes of the locking members 30 and loosely threaded into the secondary bolt-holes 26 of the saddle clamps 14 so as to hold the locking members in place. Then, the vibrators 10 can be rotated about their longitudinal axes circumferentially to a desired orientation that aligns the innermost bolt-holes 36 of the locking members 30 with the bolt-holes 52 in the end faces 48 of the vibrators. Once again, a few bolts 54 can be passed through the innermost bolt-holes 36 of the locking members 30 and loosely threaded into the bolt-holes 52 in the end faces 48 of the vibrators 10 to lock the rotational orientation of the vibrators. The remaining bolts 54 can then be inserted into their respective holes and then all bolts can be tightened, thereby completing the assembly procedure.

It should be appreciated that these steps need not necessarily be performed in the manner described to achieve the finished assembly. For example, the locking members 30 could be attached to the fixed halves 16 of the saddle clamps 14 prior to attaching the removable halves 18 of the saddle clamps. Thus, the above mentioned assembly procedure is one of several ways to assemble the vibrators 10 to the bulk material handling assembly 12. Additionally, in order to initially align the fixed halves 16 of the saddle clamps 14 with each other prior to welding or otherwise attaching the fixed halves to the bulk material handling assembly 12, it should be appreciated that semi-cylindrical cutouts can be made through the walls 20 of the bulk material assembly and then a vibrator having saddle clamps and locking members already attached can be lowered onto the cutouts. The fixed halves 16 of the saddle clamps 14 can then be welded to the walls 20 while still attached to the vibrator 10. Thus a vibrator can be used to ensure that the fixed halves of the saddle clamps are aligned during welding.

As assembled, vibrational loads generated by the vibrators 10 are carried by the saddle clamps 14. The locking members 30 may also carry a portion of the loads. When service personnel need to service the eccentric weights 42 of one of the vibrators 10, they can reach through the central openings 32 of the locking members 30 to remove the access covers 50 of the vibrator without disturbing the rest of the assembly.

In view of the foregoing, it should be appreciated that the invention achieves several advantages over prior art vibrator attachment means. For example, using the invention, vibrators can be attached to bulk material handling assemblies with relative ease, and likewise, can be replaced with relative ease. Additionally, using saddle clamps as described herein provides a robust load path between vibrators and bulk material handling assemblies.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A bulk material handling assembly comprising:
   a pair of spaced-apart walls,
   an elongate vibrator having a longitudinal axis and axially opposite end portions, the vibrator being configured to induce vibrations acting perpendicular to the longitudinal axis of the vibrator;
   a pair of saddle clamps, each of the saddle clamps comprising first and second clamp halves that are releasably secured to each other, one of the pair of saddle clamps encircling and releasably securing one of the axial end portions of the vibrator to one of the spaced-apart walls of the bulk material handling assembly, the other of the pair of saddle clamps encircling and releasably securing the other of the axial end portions of the vibrator to the other of the spaced-apart walls of the bulk material handling assembly; and
   a pair of locking members, one of the locking members being secured to one of the saddle clamps and said saddle clamp's respective end portion of the vibrator, the other of the locking members being secured to the other of the saddle clamps and said saddle clamp's respective end portion of the vibrator, the locking members preventing the vibrator from rotating about the longitudinal axis relative to the saddle clamps.

2. A bulk material handling assembly in accordance with claim 1 wherein the end portions of the vibrator are cylindrical.

3. A bulk material handling assembly in accordance with claim 1 wherein each of the locking members is attached to the first half and to the second half of the respective saddle clamp.

4. A bulk material handling assembly comprising:
   a pair of spaced-apart walls,
   an elongate vibrator having a longitudinal axis and axially opposite end portions, each of the end portions of the vibrator comprising an access cover, the vibrator being configured to induce vibrations acting perpendicular to the longitudinal axis of the vibrator;
   a pair of saddle clamps, each of the saddle clamps comprising first and second clamp halves that are releasably secured to each other, one of the pair of saddle clamps encircling and releasably securing one of the axial end portions of the vibrator to one of the spaced-apart walls of the bulk material handling assembly, the other of the pair of saddle clamps encircling and releasably securing the other of the axial end portions of the vibrator to the other of the spaced-apart walls of the bulk material handling assembly; and
   a pair of locking members, one of the locking members being secured to one of the saddle clamps and said saddle clamp's respective end portion of the vibrator, the other of the locking members being secured to the other of the saddle clamps and said saddle clamp's respective end portion of the vibrator, each of the locking members being ring-shaped and having a central opening, the access covers of the end portions of the vibrator being removable through the central openings of the locking members.

5. A bulk material handling assembly in accordance with claim 1 wherein the assembly further comprises a second vibrator and the second vibrator is attached to the bulk material handling assembly via the saddle clamps.

6. A bulk material handling assembly in accordance with claim 1 wherein the first and second clamp halves of each saddle clamp are secured to each other via bolts and each of the locking members is secured the respective saddle clamp and the respective end portion of the vibrator via bolts.

* * * * *